April 11, 1950     G. J. VAN LENNEP     2,503,693
ICE TRAY AND COVER
Filed Nov. 21, 1945     2 Sheets-Sheet 1
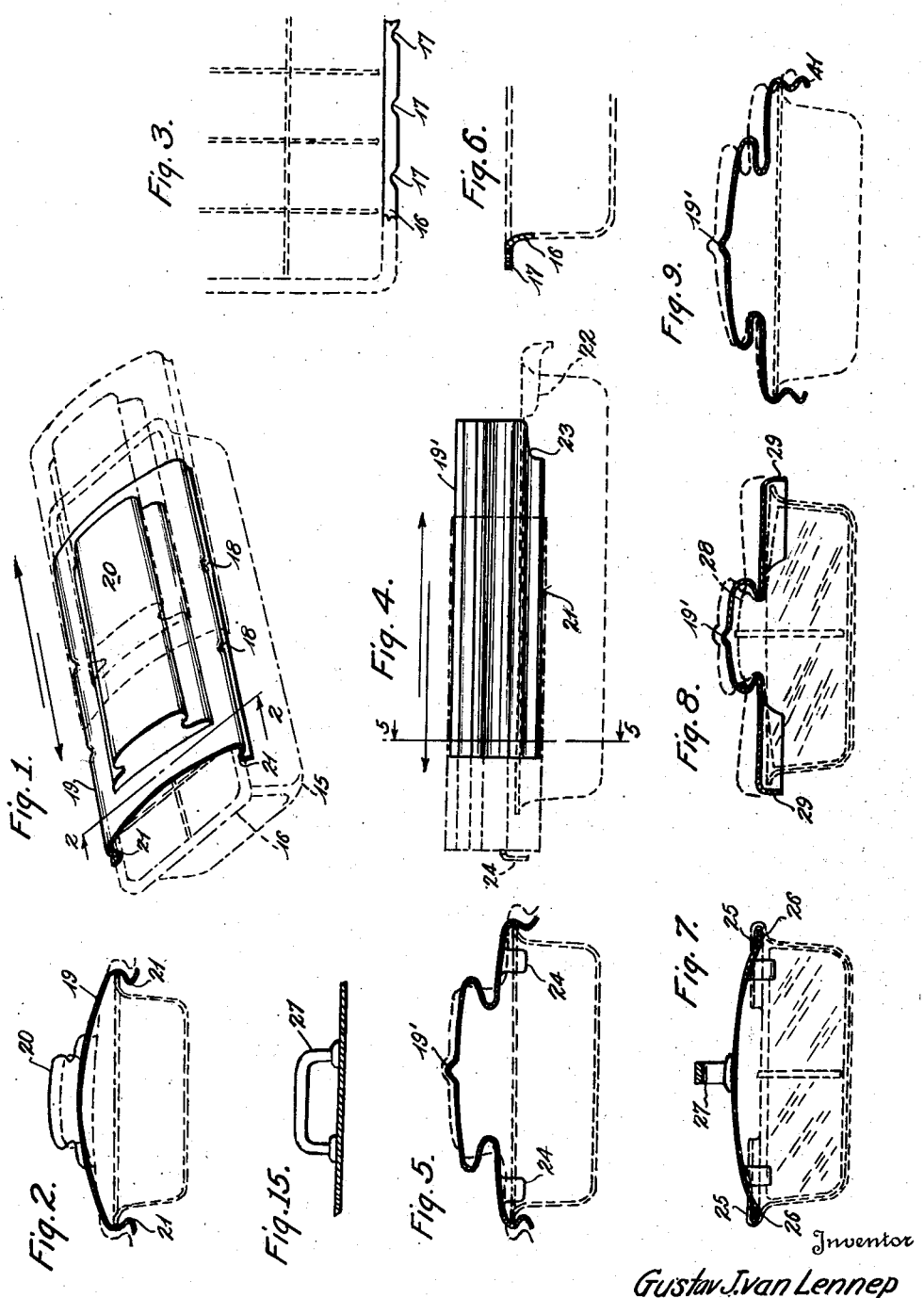
Inventor
Gustav J. van Lennep
By Jewett and Murad
Attorneys April 11, 1950 G. J. VAN LENNEP 2,503,693
ICE TRAY AND COVER
Filed Nov. 21, 1945 2 Sheets-Sheet 2
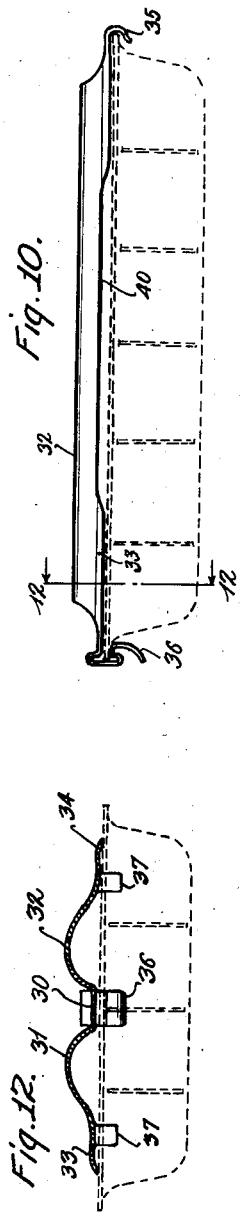
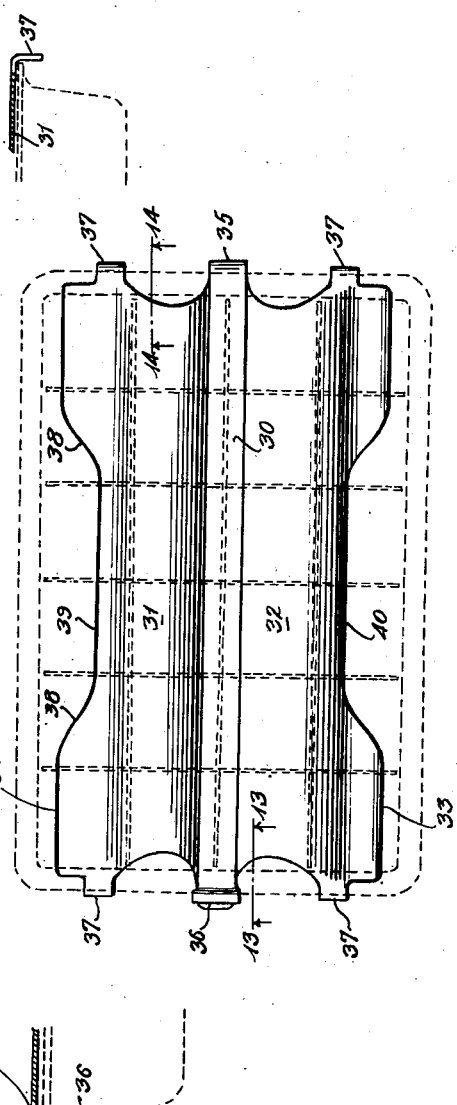
Inventor
Gustav J. van Lennep
By Jewett and Mead
Attorneys Patented Apr. 11, 1950

2,503,693

UNITED STATES PATENT OFFICE 2,503,693

ICE TRAY AND COVER

Gustav J. van Lennep, Washington, D. C.

Application November 21, 1945, Serial No. 630,042

18 Claims. (Cl. 62—108.5)

The invention relates to ice trays and has as an object the provision of an ice tray and ice tray implement for the freezing and convenient removing of ice cubes in domestic refrigerators.

It is an object of the invention to provide a tray from which one or more ice cubes may be readily removed without contact of the fingers with the ice cubes.

It is a further object of the invention to provide an ice tray having a cover, which tray and cover may be immersed in water or water may be circulated under the cover and over the ice cubes to loosen said cubes for removal without the unpleasantness of contact of the hands or fingers with the ice and which will, therefore, be more sanitary in use.

It is another object of the invention to provide a cover that will protect the hands from chilling during the handling of an ice freezing tray.

It is a further object of the invention to provide a cover for an ice tray that may be attached to or snapped over the ice tray or slid thereon in movably locking position with a portion of said ice tray.

It is a further object of the invention to provide a cover which may be expanded, contracted or readily adjusted to fit ice freezing trays of various widths, lengths, sizes and forms.

It is still a further object of the invention to provide such a cover for freezing ice trays applicable to trays having more than one or two rows of ice cubes therein.

Further objects of the invention will appear from the following description when read in connection with the accompanying drawings, showing modifications of the invention wherein—

Figure 1 is a perspective view of one form of cover in place on a tray, different positions of the cover being shown in dotted lines;

Fig. 2 is a transverse section on line 2—2 of Figure 1;

Fig. 3 is a detail plan view of a portion of the tray of Figure 1;

Fig. 4 is a side elevation of the cover applied to a different form and design of a tray;

Fig. 5 is a vertical transverse section on line 5—5 of Fig. 4;

Fig. 6 is a detail side elevation of a portion of the tray of Fig. 3;

Fig. 7 is a vertical transverse section of a still further form of tray and cover;

Fig. 8 is a vertical transverse section of a still further form of a tray and cover;

Fig. 9 is a transverse section of a tray similar to Figure 1, showing a manner of application of a cover similar to that shown in Figure 1 by a snap-on action;

Fig. 10 is a side elevation of a still further form of a tray and cover;

Fig. 11 is a plan view of the structure of Fig. 10;

Fig. 12 is a transverse section on line 12—12 of Fig. 10;

Figs. 13 and 14 are detail transverse sections on the corresponding section lines of Fig. 11; and Fig. 15 is a side elevation of the form of handle shown in Fig. 7.

As shown in Figures 1, 2 and 3, the tray 15 is designed with an outwardly projecting rim 16, the rims at the side of said tray being formed with depressions, or stops 17, to coact with indentations 18, formed in the cover 19. The cover in this form of the invention is shown as constructed with a nonmetallic handle 20, as wood or plastic which may be grasped by the hand of the user without the chilling which would result from the use of a metallic handle or the direct contact of the hand with any part of the tray or the cover attached to it. Although not essential this insulating handle is desirable of convenient use and can be varied in design. This particular cover as shown in Figures 1, 2 and 3, is intended for a standard type of ice tray and constructed with an elevated portion shown as curved, arched, or the like to provide for flow of water thereunder, as in defrosting, and to provide a spring and adherence action on inwardly projecting portions 21, these projections extending below the rim 16 of the ice tray.

As shown in Fig. 1, this cover and shield is open at both longitudinal ends to permit free sliding movement in either direction, and free circulation of water over the face of the ice cubes during the defrosting process, and also to provide for the flexibility and the spring and adherence action to the tray as mentioned hereinabove. Downward pressure upon the cover, through spring action, will release said cover from its adherence to the ice tray or the stop and indentations 17, 18 and permit the free sliding movement.

In Fig. 1, this cover and device is shown somewhat shorter than the length of the ice tray. The difference in said length is not essential but for the purpose of showing the adaptability of the same to trays of various lengths.

In the process of use and operation of this invention and specially wherein the cover is of less length or shorter than the tray, when the cover is in the midmost position, as indicated in Figure 1, it will somewhat overlap or partially cover the end pairs of the ice cubes in the tray and may be locked in this midmost position by spring action or by engagement of the indentations, or stops 18 with the notches 17 of the tray. In this position of the parts and holding the same by the handle 20, with the ice cubes covered, the tray may be defrosted, as above stated, by flowing water over the bottom of the tray—or under said cover—until the ice cubes are loosened from their respective encasements; whereupon the cover may be slipped along the lines indicated by arrows and dotted lines in Figure 1 to uncover the desired number of ice cubes to be extracted, after which by inverting the tray with attached cover, the said number of ice cubes will drop out directly into the intended receptacle. In this process of operation and use of this cover and shield, water poured over the bottom and side walls of the tray is drained along the double inverted edges 21, this double inverted edge affording a better runway longitudinally for the water and preventing also an overflow over the side walls and the hands holding the same; and water poured over the face of the cubes is drained through the open ends of the shield with the same protection for the hand.

A further and more simplified method of procedure and use of this cover in cases requiring the removal of a very few ice cubes from the tray would be placing the cover on the tray and holding the same by its handle, to dip one end of it into defrosting water then sliding the cover to uncover the number of ice cubes required and by inverting said ice tray to let the uncovered ice cubes drop out, thereby providing a sanitary procedure and a sizable saving in ice formation.

The form and design of the invention indicated in Figs. 4 and 5 has for its object the construction, through a series of expandable surfaces, bends or corrugations, to provide a cover adaptable to trays of various widths and sizes. Although no specific plastic or insulating handle is provided for as in Figure 1, the provision of additional air space between the face of the ice cubes and the ceiling of the cover provides in its design a simplified form of handle incorporated in the body of the cover. This form shows also at 19' a groove or embossed rib for the purpose of affording more substance and longitudinal rigidity and at the same time to prevent twisting of the body of the same. This form of the invention is intended to fit ice trays not provided with rims such as at 16 with depressions or stops such as at 17. To supplement to its spring action adherance to the tray and prevent slippage of the tray out of the cover when held in an inclined position such as during the process of defrosting of the tray, the form and design of Figs. 4 and 5 of this cover is provided with a pair of stops 24 at one end of said cover and extending downwardly over the extended rim of the tray. It will be understood that stops 24 may be applied to covers as shown in Figure 1, if desired, or any other form of this cover described herein and may be desirable but not essential according to the material used in the construction of the cover.

Fig. 4 shows also a form of the invention adaptable to a tray commonly in use provided with cheeks 22 at one end for convenient handling of the same. In this case the cover shown in this Fig. 4 is formed at one of its longitudinal ends with notches 23 along its edges 21 to allow the cover to clear such obstacles as 22 and be freely slipped to the right in said figure sufficiently to entirely cover the cubes encased in the cheeks area 22 during the defrosting process. In Fig. 5 an expansion of the cover is indicated in dotted lines which shows the way it may be fitted to the trays of different widths.

Fig. 7 shows the application of this invention to trays in use and constructed with an overlapping lip or lips 25. To coact with this form of an ice tray, the invention shown in this Fig. 7 is designed with straight side edges or margins 26 to slidingly underlie the lips 25. In this form of cover is shown a different simplified form of handle 27, shown in side view in Fig. 15. It is understood that this form of handle is not exclusive to this design of cover but way, as the occasion should call for, be applied to any of the other covers described herein. The curved or elevated form of Fig. 7 is not essential but desirable to provide for more suitable water drainage during the process of defrosting. In the construction of this form of cover, it is desirable that it be formed somewhat wider than the dimension of the tray, to be sprung to a more narrow condition as it is introduced under the tray margins, whereby to provide a spring adherence to the tray.

Fig. 8 shows another form of a cover which coacts with a still different form of tray, a tray with transverse grid members as shown at 28 in which the cover has vertical side margins or edges 29 overhanging the sides of the tray along its longitudinal rims and partially around one end of said tray and projecting downwardly any desired distance and fitted optionally loosely along the sides of said tray. In this form of transverse grid, or tray provided with such a grid, the cover may be slipped or slid on the grid from one end of the tray or it may be snapped over the partitioning members or main members in the manner indicated in dotted lines of Fig. 8. The straight downwardly turned margins 29 allow a more substantial runway and drainage for water poured over the bottom of the tray during the defrosting process as stated hereinbefore, allowing defrosting water to run directly between the face of the ice cubes and the ceiling of the cover and draining through the partially open downwardly overhanging margins at one end of the tray as mentioned above.

Fig. 9 illustrates the snap-on action shown in Fig. 5. This figure also shows the edge of the cover provided with an additional corrugation or reverse bend. This additional corrugation is shown to illustrate the fact that the downwardly extending margins of the cover may be formed with any desired number of corrugations, the inward concavities of any of which may be applied to the margins of the tray to regulate the elevation of the cover above the tray, as for instance to stand above upwardly extending partition members or grids for instance such as shown in Fig. 8. Such plurality of corrugations will increase the adaptability to trays of widely differing dimensions or designs.

Figs. 10 to 14 inclusive illustrate a form of cover usable with a tray having more than one or two longitudinal rows of ice cubes, four rows being shown in these figures. In this form of tray the cover is shown with a central rib portion 30 and with two expandable arch or elevated portions 31, 32 to fit trays of various widths and allow free run to defrosting water over the face of the ice cubes and the edges of the tray, the edges of the cover being depressed or embossed at 33, 34.

As illustrated in Fig. 10, this form of cover may have a hook member 35 at one end of the rib member 30 and a clasp 36 at the remaining end. The hook 35 may be placed under the lip of the tray and the cover then forced down upon the tray, whereupon due to its resiliency the clasp 36 will engage by a snap action. In this form of cover, also there are shown stop members 37 overhanging the end margins of the tray to guide the same and the cover may be either slid or snapped on at any position along the edges of the tray. As indicated the side margins are inwardly curved at 38 in such a manner that the portions 39, 40 of the cover overlap two centrally located cubes at each side. When the tray is defrosted a movement in either direction of substantially one-half of the width of these ice cubes will uncover or release a desired number, two as shown, of the cubes and when inverted these cubes will fall out of the tray in a vertical direction. Further cubes may be released at the central or side portions of the tray by corresponding movement of the cover. It will be understood that portions like the inwardly offset portions of a similar design and principle as 39, 40 may be adapted along the width of this form of tray at the ends thereof and made slidable by the omission of the hook 35 and the clasp 36 which with the overhanging members 37 could then be placed at the side of the cover for longitudinal sliding of the cover to release first the two inside cubes at an end of the tray by longitudinal sliding of the cover. It will be noted that depressions on margins 33, 34 are for the purpose of providing substance and body to this form of cover and preventing twisting of the same. It will also be understood that the principle of depressed margins 39 and 40 can be applied to any of the hereinbefore described and specified forms of trays. A further advantage of the form of the invention of Fig. 11 is that it provides a more open face of the tray, exposed to defrosting water and provides additional adaptability to trays of various widths, lengths and numbers of rows of cubes.

Minor changes may be made in the physical embodiments of the invention within the scope of the appended claims without departing from the spirit of the invention.

I claim:

1. An ice cube tray and cover structure comprising, in combination: a tray having partition means of grid form, freely removable therefrom acting to cause ice frozen in said grid to be formed as separate cubes; a cover therefor to rest on edges of the tray; and means whereby the cover is retained on the tray and is slidable thereon to uncover and allow at least one cube to drop out of the tray when defrosted and inverted.

2. The structure of claim 1 in which the upper edge of at least one partition of the cube forming means projects above the margins of the tray and is formed with reentrant portions, and wherein the cover is formed with a central portion raised above side portions of the cover and joining the latter in reentrant bends providing internal ribs interengaging with said reentrant portions to provide for said sliding movement of the cover.

3. An ice cube tray and cover structure comprising, in combination: a tray having partition means to cause ice frozen between said partition means to be formed as separate cubes; a cover therefor to rest on edges of the tray; said tray and cover formed with coacting protuberances and indentations on contacting surfaces of the cover and tray margins to locate the cover in various positions to which the cover may be moved; and means whereby the cover is retained on the tray and is slidable thereon to allow at least one cube to drop out of the tray when defrosted and inverted.

4. An ice cube tray and cover structure comprising, in combination: a tray having partition means to cause ice frozen between said partition means to be formed as separate cubes; a cover therefor to rest on edges of the tray and formed with an elevated portion rising above the plane of the edges and means whereby the cover is slidable thereon to uncover and allow at least one cube to drop out of the tray when defrosted and inverted.

5. An ice cube tray and cover structure comprising, in combination: a tray having partition means to cause ice frozen between said partition means to be formed as separate cubes; a cover therefor to rest on edges of the tray, the body of said cover of less extent than the horizontal extent of the tray by an amount at least a portion of the horizontal extent of one cube; and means whereby the cover is retained and slidable on the tray to allow at least one cube to drop out of the tray when defrosted and inverted.

6. An ice cube tray and cover structure comprising, in combination: a tray having partition means to cause ice frozen between said partition means to be formed as separate cubes; a cover therefor to rest on edges of the tray and formed with an elevated portion rising above the plane of said edges; the body of said cover of less extent than the horizontal extent of the tray by an amount at least a portion of the horizontal extent of one cube; and means whereby the cover is retained and slidable on the tray to allow at least one cube to drop out of the tray when defrosted and inverted.

7. An ice cube tray and cover structure comprising, in combination: a tray having cube molding partitions therein; a cover for said tray formed with reversely bent margins to hook about projecting margins of the tray; said cover having a longitudinal elevated formation for stiffening and under which defrosting water may be introduced and drained; handle means located on the exterior surface of said cover and presenting finger engaging reentrant grooves thereon; said cover slidable on the tray to positions to release defrosted cubes when the tray is inverted.

8. The structure of claim 7 wherein the material of the cover is sufficiently resilient to permit said margins to snap to position on the tray.

9. The structure of claim 7 in which said handle means is formed of sheet material integral with the remaining portion of the cover.

10. The structure of claim 7 in which said handle means is of sheet material integral with the remaining portion of the cover, in which said reentrant grooves comprise reverse bends of said material and are deformable to adjust the cover to fit trays of varying dimensions.

11. A cover for ice cube freezing trays comprising a sheet material structure formed with tray margin contacting portions, side portions raised above said first named portions and a central longitudinal portion integral with said side portions offset vertically from said side portions; said raised portions and said offset portion providing longitudinal rigidity to the structure.

12. The structure of claim 11 in which at least portions of the longitudinal margins of the structure are down turned.

13. The structure of claim 11 in which said central longitudinal portion is formed with a longitudinal stiffening rib.

14. The structure of claim 11 in which said central portion stands at a lower level than the crests of the elevated portions, with the ends of said central portion provided with clip means to secure the cover on an ice tray.

15. A cover for an ice cube freezing tray comprising a cover body formed with margin contacting portions to rest upon margins of the ice tray, said body formed with a portion rising above the plane of said margin contacting portions and open at an end thereof for drainage of water applied to the ice for defrosting purpose and means carried by the cover to retain the cover on a tray.

16. The structure of claim 15 wherein said retaining means comprise inturned portions of the cover body adapted to interlock with boundary portions of walls of the tray.

17. The structure of claim 15 wherein said elevated portion includes reentrant portions between the tray engaging portions and the upper part of the elevated portion permitting expansion or contraction of the cover by deformation to fit trays of different dimensions.

18. The structure of claim 15 wherein the elevated portion is deformable to vary the distance between opposite edges thereof.

GUSTAV J. van LENNEP.

REFERENCES CITED

The following references are of record in the file of this patent:

UNITED STATES PATENTS

| Number | Name | Date |
| --- | --- | --- |
| 93,432 | Gros | Aug. 10, 1869 |
| 842,613 | Bigelow | Jan. 29, 1907 |
| 1,476,910 | Naugle | Dec. 11, 1923 |
| 1,660,540 | Wulftange | Feb. 28, 1928 |